United States Patent [19]
Luckas

[11] Patent Number: 5,606,890
[45] Date of Patent: Mar. 4, 1997

[54] GEAR DRIVE

[75] Inventor: Thomas Luckas, Flowery Branch, Ga.

[73] Assignee: Siemens Aktiengesellschaft, München, Germany

[21] Appl. No.: 515,407

[22] Filed: Aug. 15, 1995

[30] Foreign Application Priority Data

Sep. 23, 1994 [DE] Germany .................. 9415460 U

[51] Int. Cl.⁶ ........................................ F16H 57/00
[52] U.S. Cl. .................. 74/411; 74/DIG. 10; 74/440; 464/89; 474/94; 474/902
[58] Field of Search .................... 74/409, 411, 440, 74/DIG. 10; 464/82, 83, 89, 90; 474/94, 152, 166, 178, 273, 902

[56] References Cited

U.S. PATENT DOCUMENTS 1,240,126  9/1917  Dubois ........................... 74/440
4,794,998  1/1989  Iwai et al. ...................... 474/94 X

FOREIGN PATENT DOCUMENTS 58-39866  3/1983  Japan ............................. 74/411

Primary Examiner—Charles A. Marmor
Assistant Examiner—Nathan O. Jensen
Attorney, Agent, or Firm—Kenyon & Kenyon

[57] ABSTRACT

A drive-end gear wheel is engaged by a drive disc through an intermediate cushion that accepts slave bars of the driving disc and reinforcement ribs of the drive-end gear wheel. The reinforcement ribs couple an inner hub with an outer ring gear flange of the drive-end gear wheel. The reinforcement ribs are formed with transition curves that uniformly transmit tangential and radial deformation stresses to the outer ring gear flange, ensuring reliable and durable operation of the drive gear.

20 Claims, 4 Drawing Sheets

GEAR DRIVE

BACKGROUND OF THE INVENTION

The present invention concerns a gear drive, in particular a drive-end gear wheel rotationally coupled to a drive disc through intermediate cushioning means. The intermediate cushioning means are elastic elements that evenly transmit the rotational load from the slave bars of the drive disc to reinforcement ribs between an inner hub and an outer flange on the gear wheel. The reinforcement ribs are advantageously designed with transition curves that evenly distribute the rotational stress tangentially onto the flange of the gear wheel.

A gear arrangement for vehicle window lift drives is known from EP-B1-0 261 525 damping disc is interposed with a drive-end worm wheel in rotating slave connection with an output-end drive disc. The worm wheel has reinforcing ribs running radially between an outer ring gear flange and an inner hub. The worm wheel engages with corresponding slots, or the drive disc with axially protruding slave cams engages with corresponding slave openings of the drive disc preferably arranged centrically between the slave slots. The slave slots and the correspondingly inserted reinforcing ribs have the same cross-section, or rather the same structural shape over their entire radial length. Axially protruding distance equalizer bars are integrally premolded on the face of the damping disc. In order to be able to resist, on the one hand, the strong tangential shearing forces acting on the reinforcing ribs when the drive disc strikes against these reinforcing ribs and, on the other hand, the strong axial tractive forces acting on the ring gear flange during the manufacture of the injection molded worm wheel, the structural elements thus strained had to be designed accordingly with material strength so as not to impair operational reliability. Moreover, for sufficient radial stiffness, the specific helical gearing-compressive load also had to be taken into account when using the gear wheel as a worm wheel in a worm gear.

SUMMARY OF THE INVENTION

According to the present invention, reinforcement ribs that couple the inner hub to the ring gear flange of a drive-end gear wheel are formed with transition curves. These transition curves widen the ribs where they attach to the ring gear flange, transmitting rotational stress uniformly and tangentially onto the flange. This assures a high insensitivity to tangential shearing and radial deformation stresses in spite of the slender size of the gear wheel, which is preferably manufactured as a plastic injection-molded part, especially in the case of a worm wheel in a worm gear.

The tangential shearing and radial deformation stresses on the reinforcement ribs arise from a drive disc with slave bars that is engaged with the gear wheel. The drive disc is engaged with the gear wheel through an intermediate cushion of elastic elements situated in the spaces between the reinforcement ribs in the gear wheel. The gaps between the elastic elements alternatively accept a reinforcement rib from the gear wheel and a slave bar from the drive disc, until all of the reinforcement ribs and slave bars are engaged in the gaps between elastic elements. Rotational forces are applied to the drive disc, causing the elastic elements to become compressed between each slave bar and reinforcement bar, thus transmitting the rotational force of the drive disc from the slave bars to the gear wheel via the reinforcement ribs.

The novel construction of the reinforcement ribs with transition curves according to the present invention causes the impact pressure of the drive disc to be deflected into non-critical tangential tensile loads in the ring gear flange while avoiding a shearing force acting perpendicularly on the reinforcement ribs. Further, a radial contractive pulling during the injection molding of the gear wheel is advanatageously distributed over a greater tangential area of the ring gear flange. When the gear wheel is used as a worm wheel in a worm gear, the support area of the worm gearing is advantageously enlarged compared to the reinforcement rib or the hub. Thus, in spite of the slender size of the reinforcement ribs, load deformations of the ring gear are avoided and the gear drive runs more reliably and smoothly.

The transition curves of the present invention result in a more uniform contacting of the intermediate cushioning in response to the rotating slave bar connection. In a preferred embodiment, this transition is made in conjunction with elastic elements. The elastic elements are preferably designed with a barrel-shaped outer contour, and serve to enhance the uniformity of the rotating slave connection by providing an intermediate cushion. The elastic elements help avoid partial stress points, which otherwise would damage the intermediate cushion after prolonged operation. The elastic elements are preferably manufactured with axially protuding distance equalizer bars to maintain proper spacing between the drive disc and the gear wheel. These bars may also be formed so as to connect two elastic elements to each other to facilitate assembly of the gear drive.

DETAILED DESCRIPTION

Figure 1:
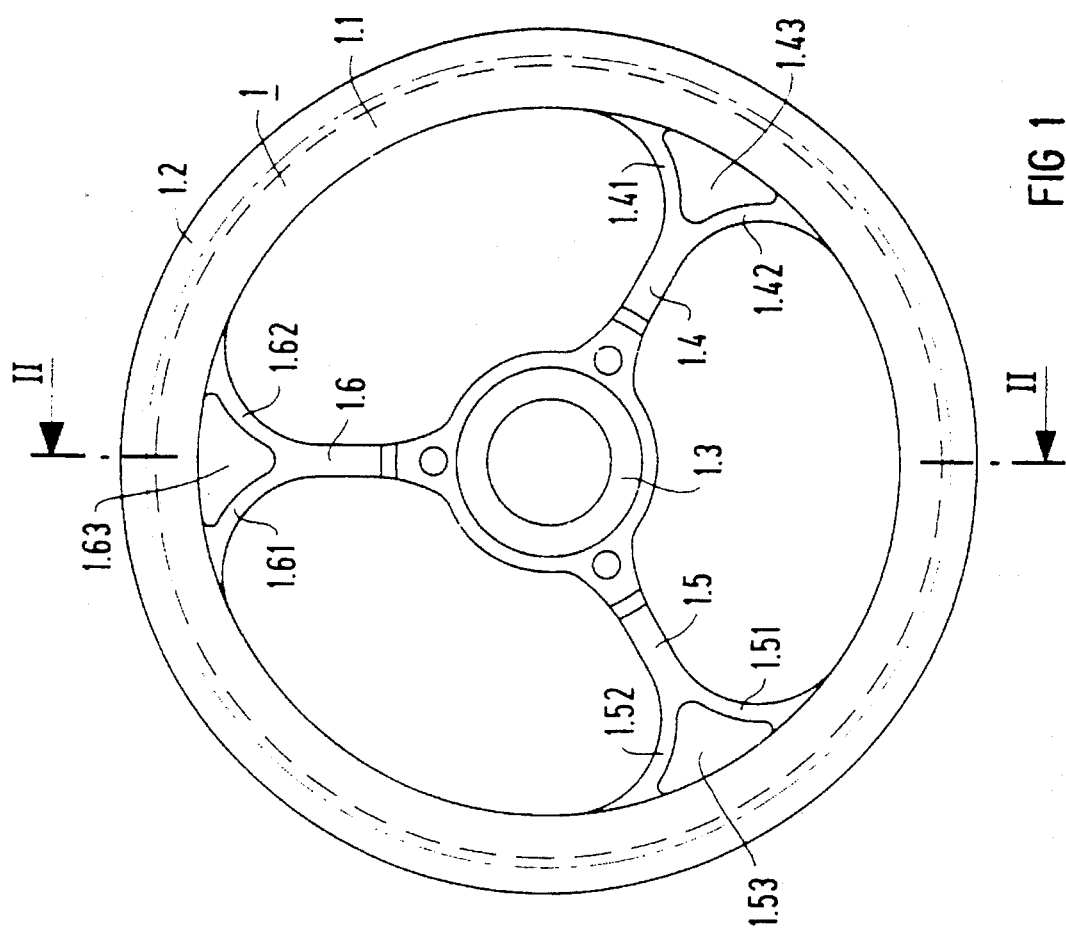
FIG. 1 shows an axial top view of the reinforcing-ribs side of the gear wheel.
Figure 2:
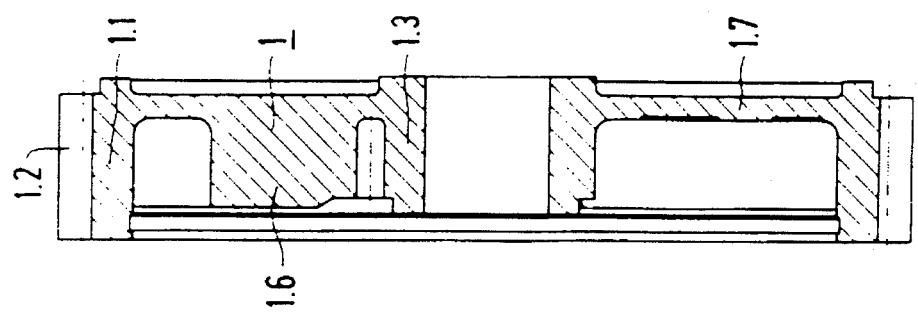
FIG. 2 shows the gear wheel according to FIG. 1 in a sectional profile II—II.

FIG. 1 and FIG. 2 show a gear wheel 1 that is supported on a gear axis by means of an inner hub 1.3 in a manner allowing rotation and is driven, for example, by a worm shaft of a worm gear (not shown) that mates with an outer ring gear 1.2. The ring gear 1.2 is supported by a ring gear flange 1.1. The ring gear flange 1.1 is connected to the inner hub 1.3 by way of three reinforcement ribs 1.4, 1.5 and 1.6.

The reinforcement ribs 1.4, 1.5 and 1.6 open outwardly from the direction of the inner hub 1.3 towards the direction of the ring gear flange 1.1 (as shown in FIG. 1) with essentially only tangentially stressing transition curves 1.41, 1.42; 1.51, 1.52; and 1.61, 1.62 into the ring gear flange 1.1. In a preferred embodiment, the transition curves are advantageously split in a fork-shaped manner leaving free spaces 1.43, 1.53 and 1.63.

FIG. 2 shows gear wheel 1 provided with a gear wheel base 1.7 from which the reinforcement ribs axially project. The gear wheel base 1.7 advantageously supports the intermediate cushioning placed between the reinforcement ribs.

Figure 4:
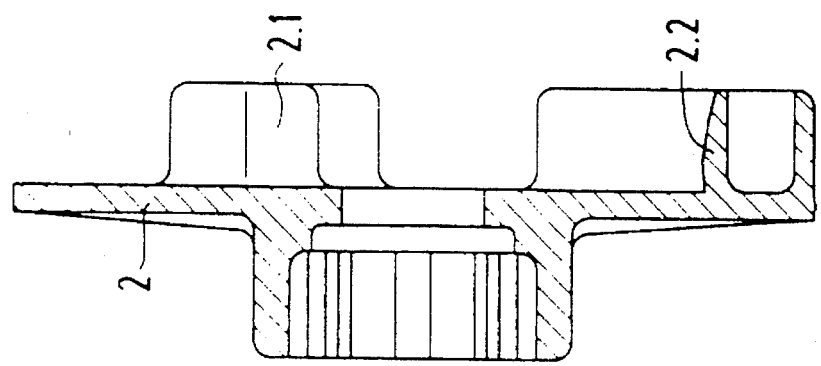
FIG. 4 shows the drive disc according to FIG. 3 in a sectional profile IV—IV.
Figure 3:
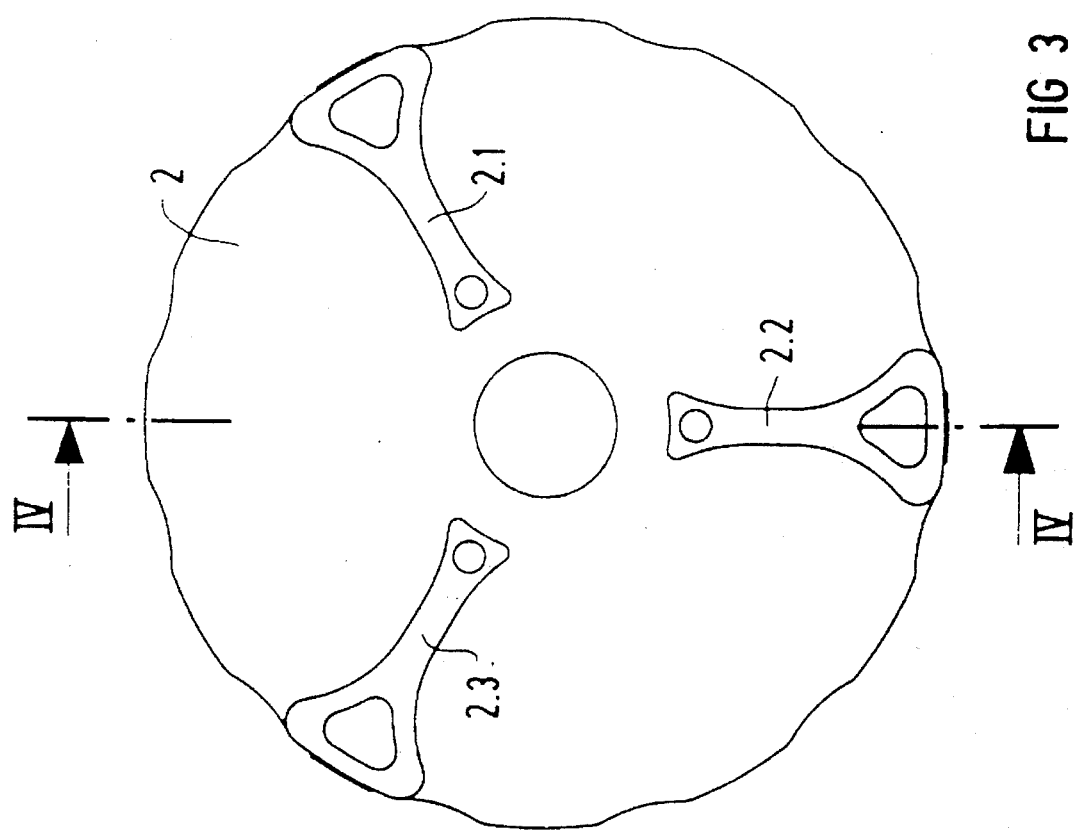
FIG. 3 shows an axial top view of the slave bar side of the drive disc.
Figure 5:
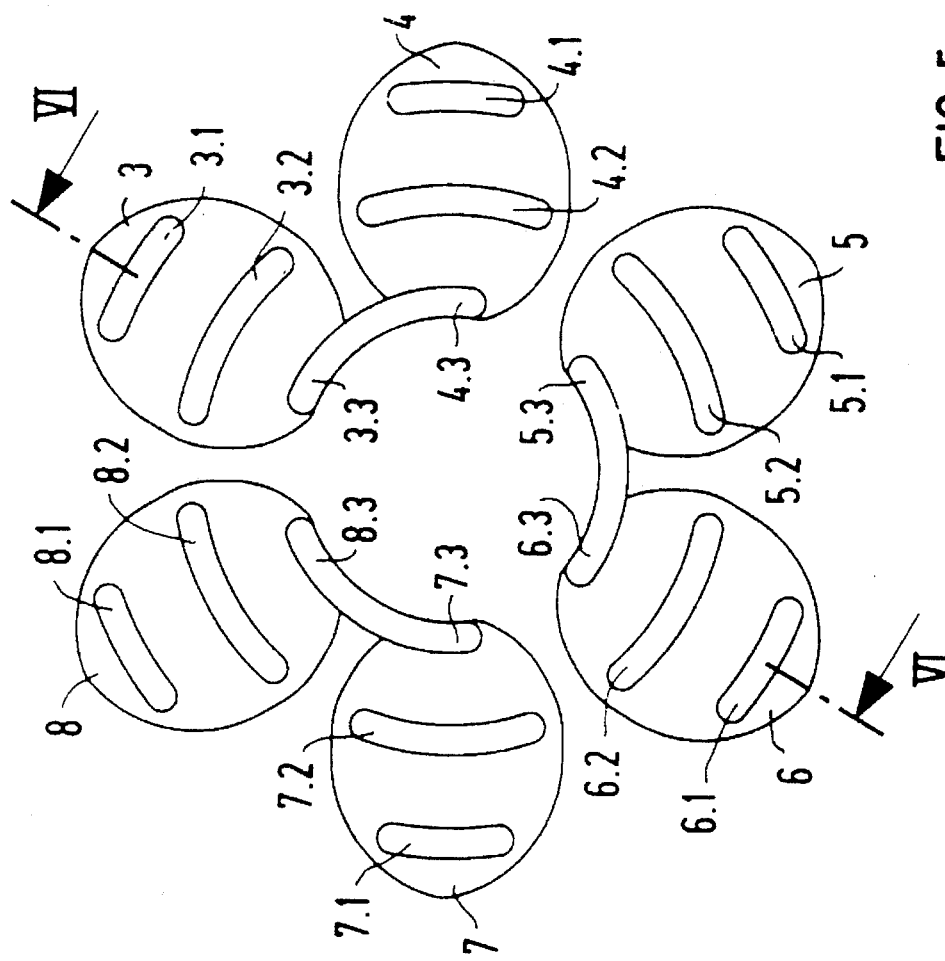
FIG. 5 shows an axial top view of an intermediate cushioning with elastic buffers.
Figure 6:
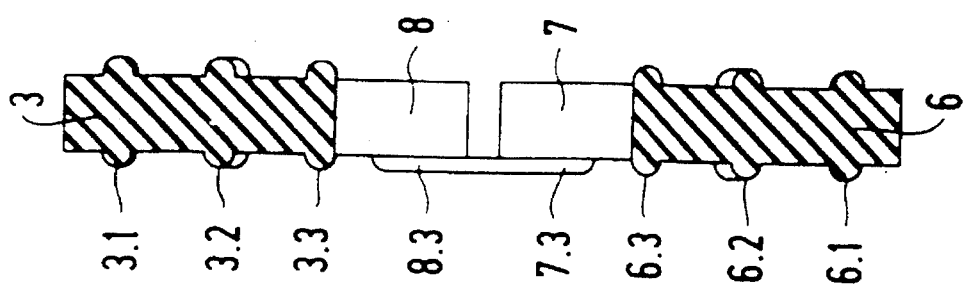
FIG. 6 shows the intermediate cushioning according to FIG. 5 in a sectional profile VI—VI.

In a preferred embodiment shown in FIG. 5 and FIG. 6, the intermediate cushioning are elastic elements preferably designed in a barrel shape. Two elastic elements are positioned on either side of each reinforcement bar, supported on the side away from the driving disc by the gear wheel base 1.7. Each slave bar (2.1, 2.2, 2.3) of the drive disc 2 (FIGS. 3 and 4) is inserted into the gaps between pairs of elastic elements surrounding the reinforcement bars. For example, referring to FIG. 5, reinforcement bars are situated between elastic elements 8 and 3, 4 and 5, and 6 and 7; the axially slave bars of the driving disc are situated between elastic elements 3 and 4, 5 and 6, and 7 and 8. In this way, drive disc 2 is engaged with gear wheel 1.

Figure 7:
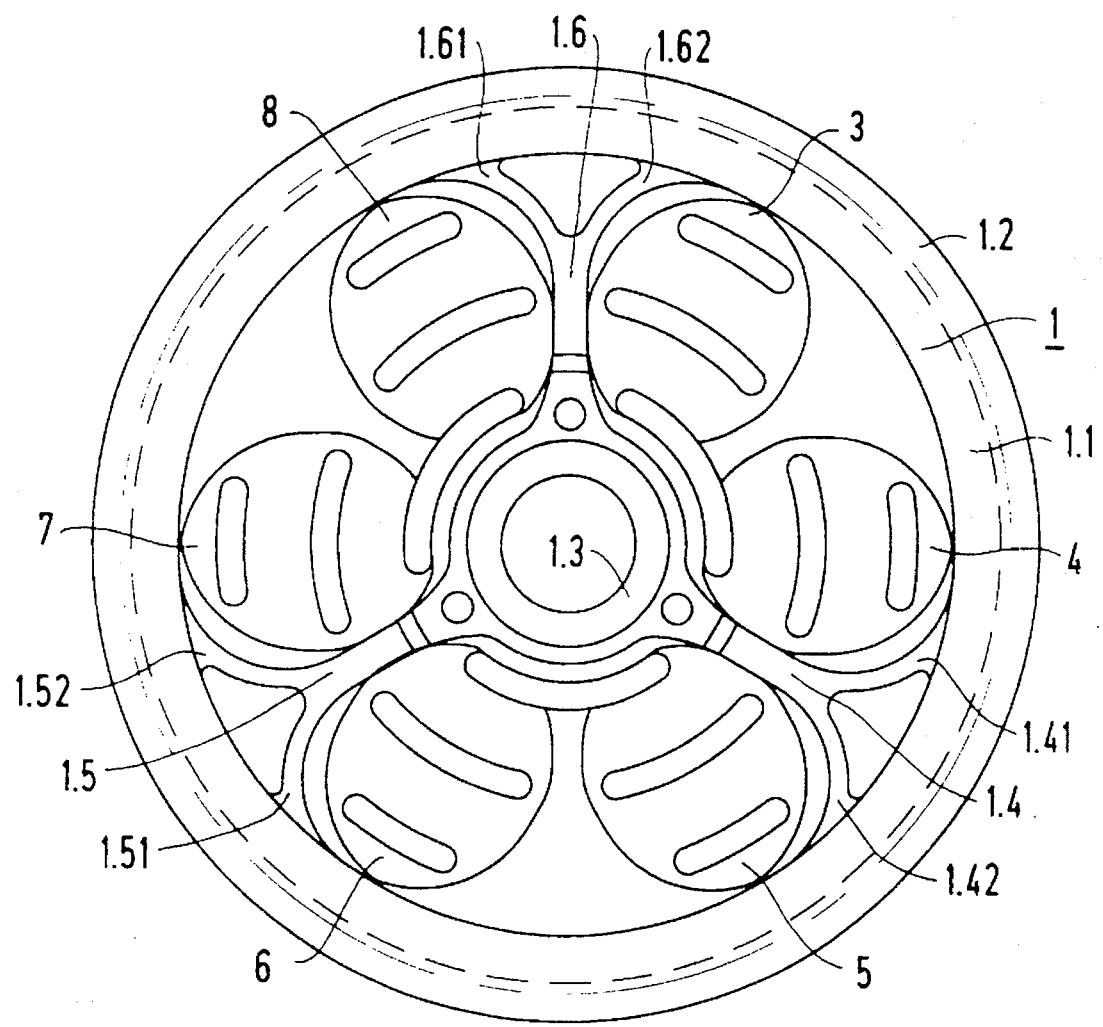
FIG. 7 shows the axial view of a gear wheel with intermediate cushioning.

The elastic elements are advantageously designed with an essentially barrel-shaped outer contour, as shown in FIG. 7. The barrel shape is formed to flushly contact inner hub 1.3. Each element is formed to abut against the outer contour of the concave transition curves of the reinforcement ribs under a tangential rotational load as the drive disc in engaged. This assures a uniform loading of the intermediate cushioning, free from partial stress points.

In a preferred embodiment, distance equalizer bars 3.1, 3.2 3.3, 4.1, 4.2, 4.3, 5.1, 5.2, 5.3, 6.1, 6.2, 6.3, 7.1, 7.2, 7.3, 8.1, 8.2, and 8.3 shown in FIG. 7 are premolded, preferably integrally, on the faces of the elastic elements. This facilitates the proper assembly in accordance with the required tolerances of the gear wheel 1, the drive disc 2, and the elastic elements 3–8.

Bridging distance equalizer bars 3.3, 4.3, 5.3, 6.3, 7.3 and 8.3 are also provided as shown in FIG. 7, preferably on the side of the elastic elements facing the inner hub 1.3, in such a way that each pair of elastic elements to be inserted in a shared space between two adjacent reinforcement ribs are joined along the lines of a one-part assembly unit. This facilitates assembly and helps to ensure proper positioning for the elastic elements.

What is claimed is:

1. A gear drive comprising:
  a) a drive-end gear wheel including
    i) an inner hub;
    ii) an outer ring gear flange encompassing said inner hub;
    iii) reinforcement ribs with substantially tangentially stressing transition curves, said reinforcement ribs widening from said inner hub towards said outer ring gear flange into said transition curves, coupling said inner hub to said outer ring gear flange.
  b) an intermediate cushioning means;
  c) a drive disc with slave bars, said drive disc rotationally coupled with said drive-end gear wheel through said intermediate cushioning means as said intermediate cushioning means come into essentially tangential contact against said reinforcement ribs and said slave bars under rotational loading.

2. The gear drive of claim 1, whereby said reinforcement ribs are each split radially outwardly in a fork-like manner into said transition curves.

3. The gear drive of claim 2 whereby said intermediate cushioning comprises a plurality of elastic element, two of said elastic elements adjacently arranged to accept one of said reinforcement ribs therebetween, sets of two of said elastic elements adjacently arranged to accept one of said slave bars therebetween, whereby each of said reinforcing ribs and slave bars of said gear drive is accepted by said elastic elements.

4. The gear drive of claim 3 whereby said elastic element has an essentially barrel-shaped outer contour, contacts flush against said inner hub, and uniformly contacts said reinforcement ribs and slave bars under a rotational load.

5. The gear drive of claim 4 whereby said elastic element is provided with axially protruding distance equalizer bars.

6. The gear drive of claim 5 whereby two elastic elements adjacently arranged to accept one of said reinforcement ribs are coupled with a radial distance equalizer bar positioned towards said inner hub.

7. The gear drive of claim 11 whereby said elastic element is provided with axially protruding distance equalizer bars.

8. The gear drive of claim 7 whereby said bridging equalizer bars are formed as an integral part of said elastic elements.

9. The gear drive of claim 7 whereby two elastic elements adjacently arranged to accept one of said reinforcement ribs are coupled with a radial distance equalizer bar positioned towards said inner hub.

10. The gear drive of claim 9 whereby said bridging equalizer bars are formed as an integral part of said elastic elements.

11. The gear drive of claim 1 whereby said intermediate cushioning comprises a plurality of elastic elements, two of said elastic elements adjacently arranged to accept one of said reinforcement ribs therebetween, sets of two of said elastic elements adjacently arranged to accept one of said slave bars therebetween, whereby each of said reinforcing ribs and slave bars of said gear drive is accepted by said elastic elements.

12. The gear drive of claim 11 whereby said elastic element has an essentially barrel-shaped outer contour, contacts flush against said inner hub, and uniformly contacts said reinforcement ribs and slave bars under a rotational load.

13. The gear drive of claim 12 whereby said elastic element is provided with axially protruding distance equalizer bars.

14. The gear drive of claim 13 whereby two elastic elements adjacently arranged to accept one of said reinforcement ribs are coupled with a radial distance equalizer bar positioned towards said inner hub.

15. The gear drive of claim 14 whereby said bridging equalizer bars are formed as an integral part of said elastic elements.

16. The gear drive of claim 13 whereby said bridging equalizer bars are formed as an integral part of said elastic elements.

17. The gear drive of claim 11 whereby said elastic element is provided with axially protruding distance equalizer bars.

18. The gear drive of claim 17 whereby said bridging equalizer bars are formed as an integral part of said elastic elements.

19. The gear drive of claim 17 whereby two elastic elements adjacently arranged to accept one of said reinforcement ribs are coupled with a radial distance equalizer bar positioned towards said inner hub.

20. The gear drive of claim 19 whereby said bridging equalizer bars are formed as an integral part of said elastic elements.

* * * * *